United States Patent
Conrad et al.

(10) Patent No.: US 9,532,411 B2
(45) Date of Patent: Dec. 27, 2016

(54) LIGHTING FIXTURE WITH APPLICATION CONTROLLER

(71) Applicant: iUNU, LLC, University Place, WA (US)

(72) Inventors: Travis Anthony Conrad, Bellevue, WA (US); Adam Phillip Takla Greenberg, San Francisco, CA (US); Kyle Terrence James Rooney, University Place, WA (US)

(73) Assignee: iUNU, LLC, Seattle, WA (US)

( * ) Notice: Subject to any disclaimer, the term of this patent is extended or adjusted under 35 U.S.C. 154(b) by 24 days.

(21) Appl. No.: 14/677,910

(22) Filed: Apr. 2, 2015

(65) Prior Publication Data

US 2015/0289328 A1    Oct. 8, 2015

Related U.S. Application Data

(60) Provisional application No. 61/975,705, filed on Apr. 4, 2014.

(51) Int. Cl.
  *H05B 37/02*   (2006.01)
  *H05B 33/08*   (2006.01)

(52) U.S. Cl.
  CPC ...... *H05B 33/0809* (2013.01); *H05B 33/0863* (2013.01); *H05B 33/0869* (2013.01); *H05B 37/0218* (2013.01); *H05B 37/0272* (2013.01)

(58) Field of Classification Search
  USPC ............ 315/149, 297, 307, 308; 47/1.3, 17, 47/DIG. 6
  See application file for complete search history.

(56) References Cited

U.S. PATENT DOCUMENTS

| | | | | |
|---|---|---|---|---|
| 8,299,722 B2* | 10/2012 | Melanson | .......... | H05B 33/0869 315/291 |
| 8,373,361 B2* | 2/2013 | Smits | ............................ | 315/297 |
| 8,523,385 B2 | 9/2013 | Lu et al. | | |
| 8,604,700 B2 | 12/2013 | Waumans et al. | | |
| 8,760,074 B2* | 6/2014 | Raj | .................... | H05B 33/0869 315/153 |
| 8,810,159 B2* | 8/2014 | Nuhfer | ............... | H05B 33/0815 315/291 |

(Continued)

FOREIGN PATENT DOCUMENTS

WO    2014037852 A1    3/2014

OTHER PUBLICATIONS

"International Search Report and Written Opinion" for PCT/US2015/024353, Mailed Jun. 26, 2015, 15 pages.

*Primary Examiner* — Thuy Vinh Tran
(74) *Attorney, Agent, or Firm* — Han Santos Reich, PLLC

(57) ABSTRACT

More efficient full spectrum lighting technology provides new lighting possibilities. A system that implements full spectrum lighting technology includes a lighting fixture that includes one or more light sources, in which the lighting fixture spectrally varies a light output of the one or more light sources in response to an electronic output signal. The system further includes a light sensor that monitors an output light spectrum provided by the one or more light sources. The system also includes an application controller that determines whether the output light spectrum from the one or more light sources follows a program. The application controller generates an electronic output signal to spectrally vary the light output of the one or more light sources in order to follow the program.

23 Claims, 9 Drawing Sheets

(56) References Cited

U.S. PATENT DOCUMENTS

| | | | |
|---|---|---|---|
| 2005/0281027 A1* | 12/2005 | Capen | A01G 7/045 362/231 |
| 2011/0183368 A1* | 7/2011 | Chapman | A01G 7/045 435/29 |
| 2012/0206050 A1* | 8/2012 | Spero | B60Q 1/04 315/152 |
| 2013/0139437 A1 | 6/2013 | Maxik et al. | |
| 2014/0055043 A1 | 2/2014 | Ivey et al. | |
| 2015/0230409 A1* | 8/2015 | Nicole | A01G 7/045 47/17 |

* cited by examiner

LIGHTING FIXTURE WITH APPLICATION CONTROLLER

CROSS REFERENCE TO RELATED PATENT APPLICATION

This application claims priority to U.S. Provisional Patent Application No. 61/975,705, filed on Apr. 4, 2014, entitled "Lighting Fixture with Application Controller," which is hereby incorporated by reference in its entirety.

BACKGROUND

Lighting has many applications across a number of industries. Different spectrums serve different purposes that range from illuminating a work environment, to optimize safety, and to printing PCB boards. One application in particular that is experiencing a rise in innovations is horticulture. Artificial lighting has been used to grow plants for decades, but the technology to do so has experienced only minor improvements compared to innovations in all other aspects of horticulture, such as growth mediums, nutrients, and irrigation system. The use of lighting for horticulture is expected to increase dramatically over the coming decades, which. Such an increase may give rise to more advanced technologies that eliminate the follies of the status quo.

Conventional lighting technologies used in horticultural applications have inherent deficiencies based on the technologies incorporated. High intensity discharge lamps ("HID"), produce significant output in terms of lumens, which is light that falls within the spectrum visible to the human eye. However a large proportion of that output falls within the spectral range of infrared, or heat. This heat may be detrimental to growth of plants and requires the use of active fixture ventilation systems paired with Heating Ventilation and Air Conditioning ("HVAC") systems to manage the heat effectively. Not only do the bulbs themselves produce a large amount of heat, but the ballasts used to maintain the wattage for bulb ignition and operation also produce heat due to hardware inefficiencies. All of this heat output creates environmental control challenges that lead to subpar growth and overuse of water resources to compensate.

Aside from HID lighting, light emitting diode ("LED") technology has been attempting to gain traction within the horticulture industry for the last decade. The deficiencies associated with LED fixtures are not so much in terms of heat but are in terms of scalable output and canopy penetration. In terms of output scalability, if a certain output is desired, a fixture must contain a sufficient number of diodes to achieve this output. This not only increases the number of failure modes, but increases the cost to the consumer. In terms of penetration, LEDs simply do not produce enough photon flux, typically measured in $\mu$moles/sec/area, to penetrate beyond the upper canopy of plants. Also, since LEDs are a point source light, light distribution is uneven and creates points called "hotspots." These "hotspots" will have significantly more photon flux than other parts of an area covered by a light, causing uneven growth.

The current standard for commercial HID grow lighting is 1,000 Watts (W) per light. This number is derived from the wattage used to power high pressure sodium (HPS) light bulbs, which are the bulbs used during the flowering phase of growing. This high wattage is necessary to create an arc between the sodium gases that are contained within the arc tube. To keep this high wattage constant, mechanical, or digital ballast must be used. The use of such types of ballasts may create further inefficiencies. These sort of inefficiencies are unsustainable and may have an overall negative impact on society as a whole, whether it be in terms of power usage or in the manufacture and disposal of bulbs. The inefficiencies are the result of reliance on a technology that, as of this writing, is over fifty years old. Although LED technology makes claims to be more efficient, this is not true in many instances. The reality is that to achieve output even close to that of an HID system, the total wattage used by an LED system may be as high as approximately ninety percent of what an HID system uses.

Further, current lighting technologies offer little to no control over spectrum once a bulb is selected and put into use. In terms of HID bulbs, spectrum varies slightly between bulb manufacturers. However, there is one common trend among all of them. The common trend is that large proportions of unusable green and yellow wavelengths. These wavelengths fall approximately within the range 550 nm to 620 nm, and account for seventy to ninety percent of relative energy. In comparison, beneficial blue and red wavelengths produced by HID Bulbs, generally between 450 nm and 650 nm respectively, may account for only fifteen to thirty percent of the relative energy. The spectrum produced by HID bulbs are generally not adjustable, and bulb depreciation may results in the loss of the beneficial wavelengths for growth first, which leads to frequent bulb replacement.

In terms of LED technologies, blue and red wavelengths, approximately 420-480 nm and 640-700 nm respectively, are used exclusively within LED arrays. Although this would seem like the answer to the issues with HID lighting, the lack of a full spectrum introduces new issues. The use of 450 nm blue and 650 nm red provides optimum levels for the production of chlorophylls B and A, respectively. However, although these wavelengths are important, full spectrum lighting remains important for healthy growth due to other sub-processes occurring at the cellular level of plants.

Current lighting technologies have a fixed footprint, i.e., the coverage area is locked in at a shape determined by the shape of the fixture hood for HID lighting and by the shape of the light array with respect to LED lighting. Since present LEDs do not use reflectors, the overall shape of the fixture dictates the footprint. This limits the coverage area and most often leads to wasted output. Currently, the only way to change the coverage area is by raising and lowering the light, which affects the amount of output coming in contact with the plants and photosynthesis by the plants. As the light moves further away, less photon energy penetrates the canopy. Optimum distance from canopy is approximately twelve to eighteen inches, and as of now no light can adjust the footprint while maintaining this optimum height.

Accordingly, current technology do not provide horticultural lights for which power, spectrum, coverage, and other factors may be controlled as a function of time. Because plants go through different growth stages in which each stage benefits from a different light configuration, tailoring a horticultural light to these different stages would result in a highly efficient and optimized system. However, present technology does not perform this dynamic configuration to optimize for differ growth stages because present technology does not monitor and adjust spectrum, power consumption, heat dispersion, moisture, and other variables conducive to growing. Moreover, present technology also do not offer horticultural lights that can be harnessed in tandem to other outputs, such as audible frequency generation that stimulate growth, and the ability to modify coverage area while maintaining uniformity of coverage.

BRIEF DESCRIPTION OF THE DRAWINGS

The Detailed Description is set forth with reference to the accompanying figures.

DETAILED DESCRIPTION

Context and Conceptual Framework

Figure 1:
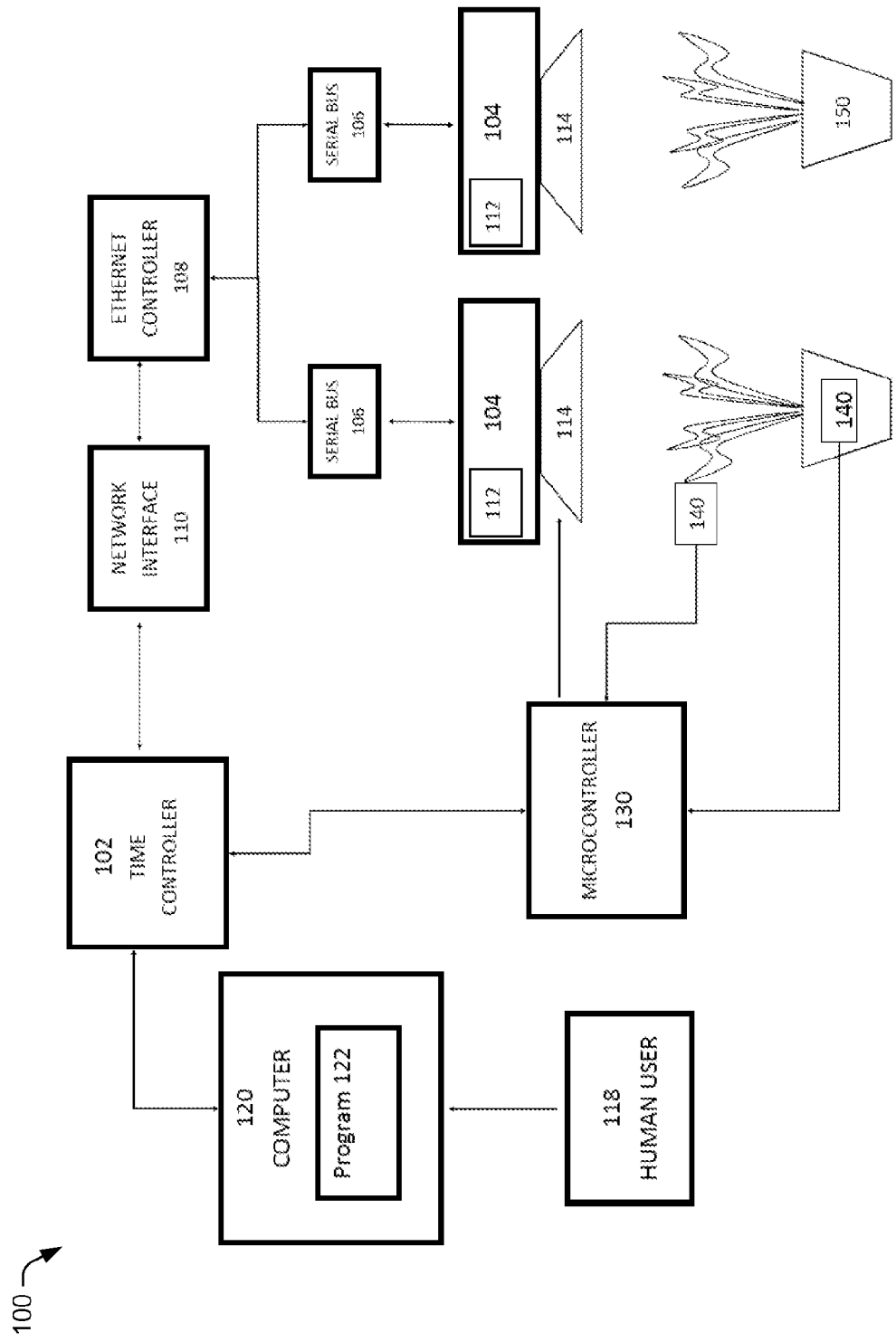
FIG. 1 is a context diagram for a lighting fixtures with an application controller.

This disclosure describes, in part, a lighting fixture that is configured with an application controller system utilizing hardware and software applications. The application controller receives information from sensors configured to a microcontroller, in which the information is then transmitted to a computer and interpreted by a software application. The application controller may also receive time indication from a system clock on the microcontroller, or from an external clock. When an application controller is configured to receive time indications, the application controller may be referred to as a time controller. The application may then modify, either through user interaction or programmed automation, the mechanical or electronic outputs of the lighting fixture based on a desired configuration. The lighting fixture, application controller, and computer are connected through a network interface utilizing standard Ethernet technologies. The lighting fixture transmits and receives data through a serial bus. The data is further translated by an Ethernet TCP/IP controller, which then transmits the data through the network interface.

In various embodiments, the application controller may be hardware, firmware, and/or software based. The application controller may be a part of one or more applications of a computing device, and the application controller may configure data at the binary level. Alternatively, the application controller may be a standalone hardware device that communicates with a software application using built in firmware.

The application controller may receive data from sensors through a physical connection with a microcontroller, or alternatively through a network interface that is connected to a microcontroller through Ethernet controllers. Sensors utilized are not limited in any manner, thus allowing any data relevant to an optimized horticultural application to be interpreted and utilized by the tandem operation of the application controller, software application, and lighting fixture.

The application controller may receive commands from a programmed application, uploaded applications from third party sources, or human/user input commands. The commands may be provided a single time, incrementally, or provided and then updated at intervals. Outputs from the application controller may be electronic or mechanical and may be received by the lighting fixture through network interface or direct connection. Electronic outputs may include signals that affect multiple lighting fixtures activated, spectrum produced, audible frequencies produced, watering intervals, volumes, and durations, and fan speeds. Mechanical outputs may include signals that affect coverage area produced by the reflector, wall angles, and the height of the lighting fixture. For example, the height of the lighting fixture may be adjust via a motorized cable or pulley system that lifts or lowers the lighting fixture (i.e., change a position of the lighting fixture) relative to the plants.

Introduction to a Lighting Fixture with an Application Controller

Horticultural lights for which there is control over power, spectrum, coverage, as well as other factors as a function of time may be beneficial. Additionally, horticultural lights that can dynamically respond to environmental conditions e.g., conditions that are detected exterior sensors, may offer superior performance over existing horticultural lighting solutions. Further, horticultural lights that can be harnessed in tandem to other outputs may provide greater operational flexibility than existing horticultural lighting solutions.

FIG. 1 illustrates an example environment of a lighting fixture configured with an application controller. The application controller may take inputs from a program, a human user, external sensors, and/or a network interface. In turn, the application controller may provide electronic and/or mechanical outputs to one or more lighting fixtures. As illustrated, the application controller 102 may be connected to the lighting fixture 104 through a serial interface 106 of the fixture. The application controller 102 is also coupled in tandem with an Ethernet controller 108 and a network interface 110. The application controller 102 can receive inputs from the network interface 110, a human user 118, an application program 122, and/or a microcontroller 130. The microcontroller 130 may relay inputs from one or more sensors. The sensors may include, but not limited to, a moisture sensor 140 and a light sensor 142. The microcontroller 130 may also respond to outputs from an application controller 102 to cause a mechanical output within the lighting fixture 104. Such modifications may include a modification of a reflector 114 to change light output coverage area by the lighting fixture 104.

In various embodiments, the application controller 102 may be any sort of device that is able to receive inputs and send outputs to affect the performance of the lighting fixture 104. The application controller 102 may be a hardware device utilizing firmware that communicates with an application program 122. In other embodiments, the application controller 102 may have integrated software that allows a human user 118 to interact with the controller directly. The application controller 102 may be connected to one or more lighting fixtures 104 through the network interface 110 and the microcontroller 130. Accordingly, the application controller 102 may receive input from an application program 122 to adjust spectrum over time, i.e., changing the amount of lumens produced at a specified wavelength or a range of wavelengths produced over a specified duration. The application controller 102 may receive input from one or more sensors 140. For example, the one or more sensors 140 may enable the application controller 102 to receive the outputs of the lighting fixture 104, outputs from third party devices such as audible output devices 112, and outputs from all sensors relevant to environmental control and optimization.

Figure 2:
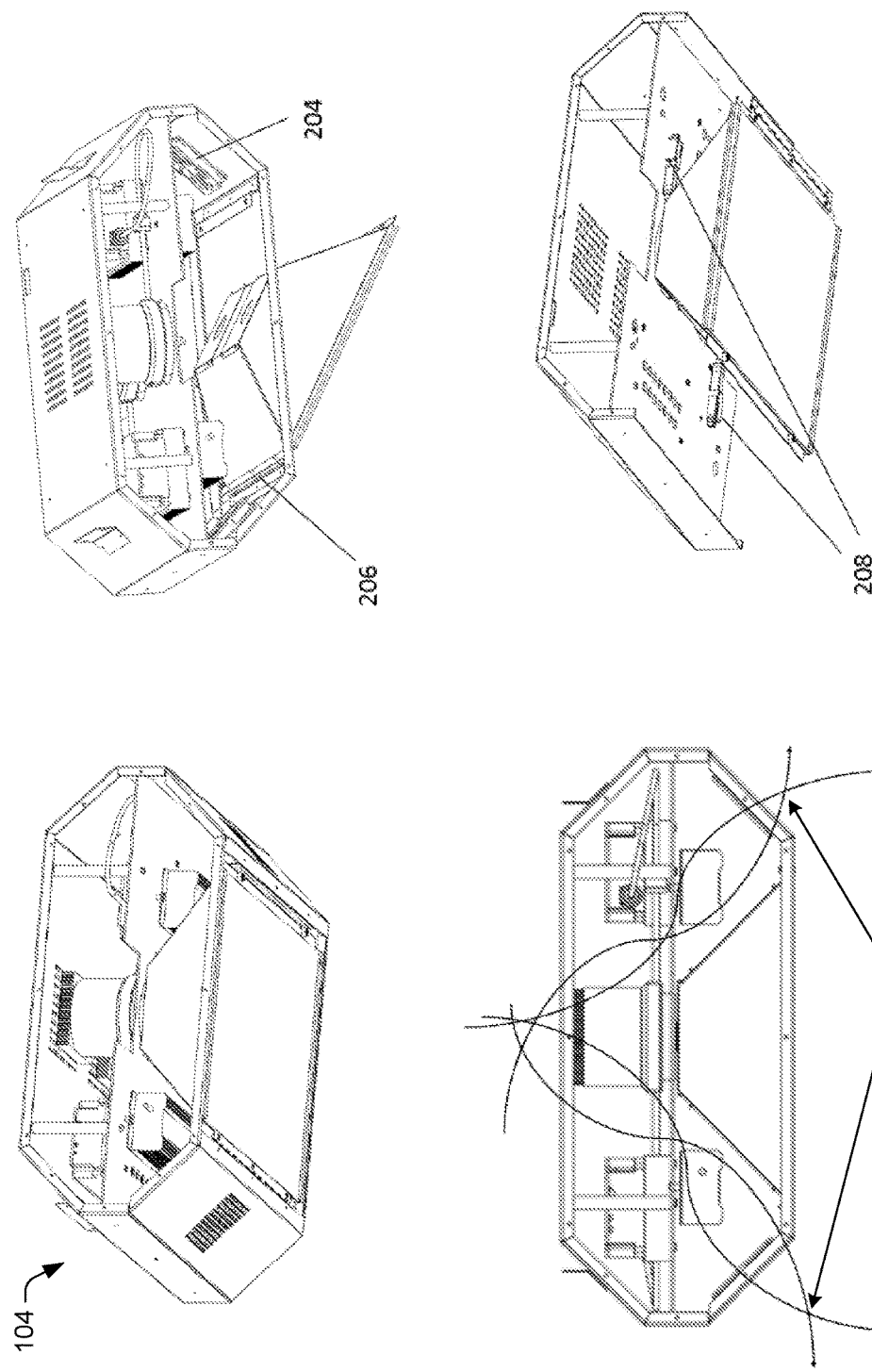
FIG. 2 is a hardware diagram for an exemplary lighting fixture.

The lighting fixture 104 may be any sort of lighting fixture that may be used for horticulture, including Plasma and LED. An example lighting fixture is shown in FIG. 2 and described below in reference to that figure.

The Ethernet controller 108 may be any controller capable of enabling serial devices to be IP/Network connected. The Ethernet controller 108 may use interfaces RS232, RS485, and RS422. The Ethernet controller 108 may use, without limitation, protocols TCP, IP, UDP, Telnet, ARP, DHCP, ICMP, PPPoE, HTTP, or DDNS.

The network interface 110 may be any system of software and/or hardware interface between the application controller 102 and the Ethernet controller 108. For example, the network interface 110 may be a router. The audible output devices 112 may include any device capable of producing an audible frequency, such as a speaker, in response to an electronic output produced by the application program 122, the application controller 102, or any combination of the two.

The reflector 114 may be any reflector that is able to be modified to affect the coverage area produced by the lighting fixture 104. The reflector 114 may be modified by mechanical outputs from the application controller 102, the application program 122, a microcontroller 130, or some combination of the three while still maintaining uniformity of light coverage which may be verified by a sensor 140. For example, the sensor 140 may have an array of light intensity sensors that are able to determine light intensities at multiple locations. Thus, the application controller 102 is able to determine a uniformity of the light coverage from a degree of differences or the lack of differences in light intensities at these multiple locations. The sensor 140 may typically, but not exclusively, be proximate to a plant 150 to be monitored.

The application program 122 may be any third party or user created set of computer executable instructions capable of specifying controls for the lighting fixture. The controls may govern the reception and interpretation of sensor data, as well as the production of electronic and mechanical outputs based on the program being employed. The application program 122 may operate within any sort of computer operating system. The electronic outputs of the application program 122 may include signals for changing spectrum and intensity over time, producing audible frequencies through an audible output device 112 (e.g., speaker), changing watering schedules or watering volumes, and changing concentrations of $CO_2$. For example, the concentration of $CO_2$ may be artificially increased in the environment via a $CO_2$ generator. The Mechanical outputs of the application program 122 may include signals for modifying coverage area over time, changing fan speeds for heat management, and raising/lowering the light.

The microcontroller(s) 130 may perform data acquisition and sensor interfacing to enable data from the sensors 140 to be read and analyzed by the application program 122. The microcontroller(s) 130 may also perform the control actuation of the reflector system in order to change the uniform light output coverage area. In some embodiments, the microcontroller(s) 130 may interface with the network interface 110 or directly with the application controller 102.

In various embodiments, the sensor 140 may be any sort of device able to measure a physical quantity and convert it into a signal which can be read by the application program 122. The physical quantity measured by the sensor 140 may be any output relevant to horticulture that is able to be manipulated by the application program 122 or a human user 118.

Lighting Fixture

In some embodiments, the lighting fixture 104 may appear as shown in FIG. 2. With respect to the application controller 102, the lighting fixture 104 may manage heat in a reverse convection fashion as shown in 202. Reverse convection is made possible by a fan 204, such as that typically used to cool central processing units ("CPUs"). The fan 204 may respond to inputs from the application controller 102. Heat management may change over time depending on the application program 122. The application controller 102 may also control mechanical outputs such as coverage area through use of linear actuators 208. The actuators 208 may change coverage area while still provide uniform coverage through calculations made by the application program 122 in response to sensors 140. Reflector hinges 206 may allow ease of maintenance of the fixture such as bulb changes, replacing fans, and replacing power supplies. The lighting fixture 104 may also utilize symmetry to aid in balancing of the fixture to avoid unwanted tilting during hanging as well as foster handling of the unit without injury due to strain.

Figure 3:
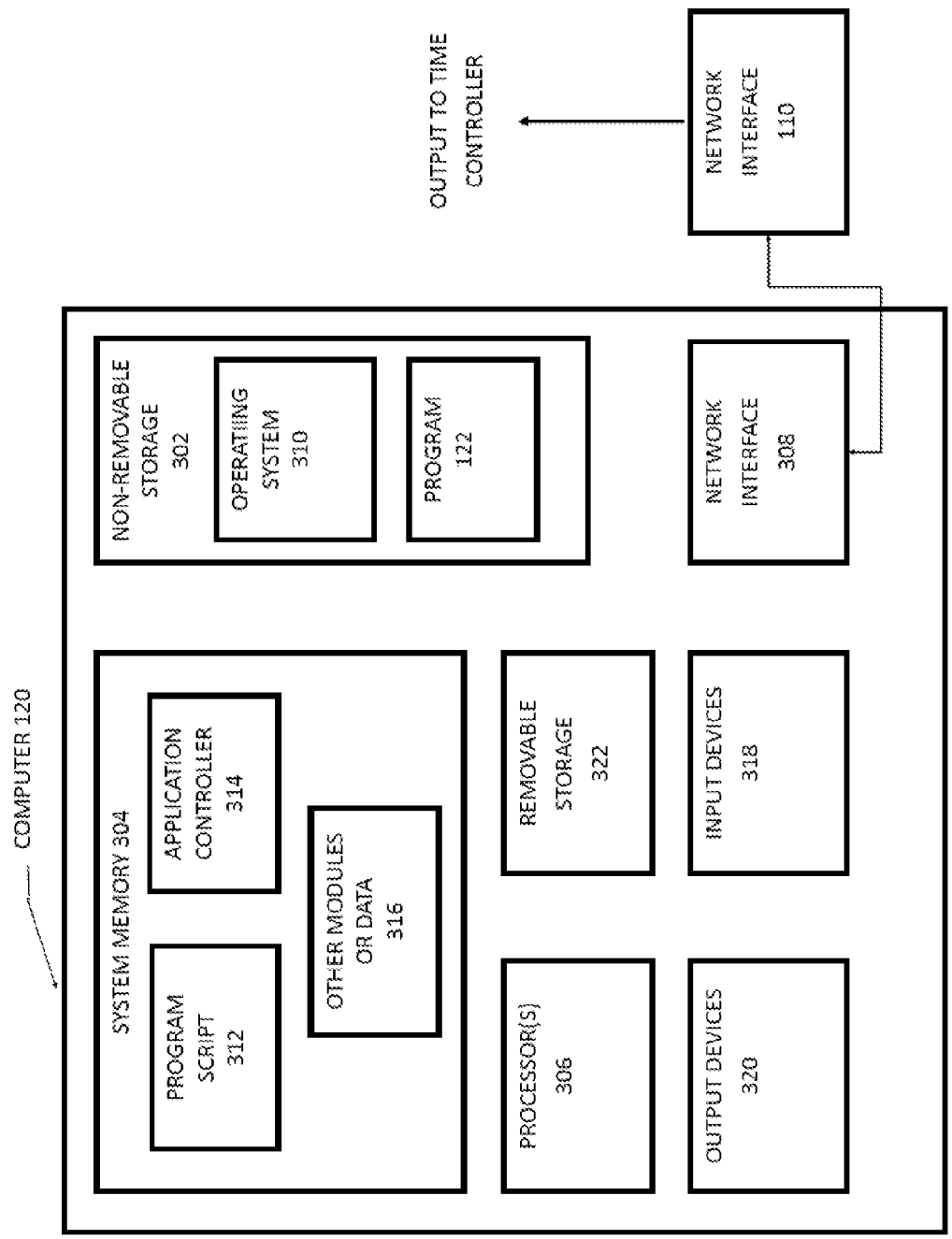
FIG. 3 is an exemplary hardware diagram used for a lighting fixtures with an application controller.

Hardware/Software Environment for a Lighting Fixture with an Application Controller FIG. 3 illustrates a component level view of a computer that contains the application program 122. As illustrated, the computer 120 may include non-removable storage 302 and system memory 304. The non-removable storage 302 may store the operating system 310 and potentially a preloaded application program 122. The system memory 304 may store the application program 312, the application controller 314, and other modules or data 316. Also, the computer 120 includes processor(s) 306, a network interface 308, input devices 318, output devices 320, and a removable storage 322. The computer 120, network interface 110, and the application program 122 are described above in detail with regard to FIG. 1. In various embodiments, non-removable storage 302 may be any storage media that can be used for the back-up or archiving of data and storage of the operating system 310. The application program 122 may also be stored within the non-removable storage 302 as depicted in FIG. 3.

In various embodiments, system memory 304 is volatile, such as Random Access Memory ("RAM"), non-volatile, such as Real Only Memory ("ROM") and flash memory, or some combination thereof. The system memory stores the application program 312, the application controller 314 and other modules and/or data 316.

In various embodiments, the processor(s) 306 is a central processing unit ("CPU"), a graphics processing unit ("GPU"), or both CPU and GPU, or another sort of processing unit. The processor(s) 306 may have an internal system clock that may be set to local time. In the alternative, there may be a system clock (not shown) external to the processor(s) 306.

The computer 120 may also include additional methods of receiving data through devices such as removable storage, for example, flash memory, magnetic disks, optical disks, memory card, or tape. Removable storage may be used, for example, if a program were acquired from a third party source, the program can saved to and executed from the non-removable storage 302 within the computer 120. Such additional storage is illustrated in FIG. 3 by removable storage 324. Tangible computer-readable media may include volatile and non-volatile, removable and non-removable media implemented in any method or technology for storage of information, such as computer executable instructions, data structures, program modules, or other data. Non-removable storage 302, System memory 304, and non-removable storage are all examples of computer readable storage media. Computer readable storage media include, but are not limited to, RAM, ROM, Easily Erasable Programmable Read Only Memory ("EEPROM"), flash memory or other memory technology, Compact Disk-Read Only Memory ("CD-ROM"), digital versatile disks ("DVD") or other optical storage, magnetic tape, magnetic disk storage, or other magnetic storage devices, or any other medium which can be used to store desired information which can be accessed by the computer 120. Any such tangible computer-readable media may be part of the computer 120.

The network interface 308 may be any system of software and/or hardware interface between the computer 120 and network interface 110. The network interface 308 for example, may be an internal network card.

The operating system 310 may be any computer operating system such as Windows™, Mac OS™, and Linux. The application program 312 comprises computer executable instructions. Computer executable instructions are typically in the form of operational codes ("opcodes") and their parameters, corresponding to the processor(s) 306 instruction set. Application programs 312 may be created from programming languages compiled and linked into computer executable instructions. Alternatively, application programs may be scripts written in a scripting language such as Perl or Python, or interpreted bytecode and parameters compiled from a program written in a computer programming language. In these two latter cases, a run-time (not shown) may constitute computer executable instructions as it interprets an application program 312 in the form of a script, or an application program 312 in the form of bytecode and parameters.

The application controller 314 is a program in system memory 304 that executes application programs 122 and 312. The application programs 122 and 312 may be stored either in system memory 304 or in non-removable storage 302. The application programs 122 and 312 may be preloaded in the system memory 304 or the non-removable storage 302. Alternatively, the application programs 122 and 312 may arrive in the removable storage 322 and be either executed in place, or copied to the system memory 304 or the non-removable storage 302. Furthermore, application programs 122 and 312 may be loaded into the system memory 304 or the non-removable storage 302 via the network interface 308 from the Internet, a local area network, or a peer to peer network connection.

The application controller 314 may receive commands and flow of control logic in the application programs 122 and 312. Further, the application controller 314 may interfaces with all portions of the computer 120, including but not limited to, input devices 318 and output devices 320. The operation of the application controller 314 is described with respect to FIG. 4. The other modules or data 316 stored in the system memory 304 may comprise any sort of applications or platform components of the computer 120, as well as data associated with such applications or platform components.

In various embodiments, the input devices 318 include any sort of input devices known in the art. For example, the input devices 318 may include a camera, a microphone, a keyboard/keypad, or a touch-sensitive display, a multi-key keyboard (such as a conventional QWERTY keyboard), or one or more other types of keys or buttons, and may also include a joystick-like controller and/or designated navigation buttons, or the like.

In some embodiments, the output devices 320 include any sort of output devices known in the art, such as a display (e.g., a liquid crystal display), speakers, etc. The output devices 320 also include ports for one or more peripheral devices, such as headphones, peripheral speakers, or a peripheral display.

Software for Lighting Fixture with Application Controller

Figure 4:
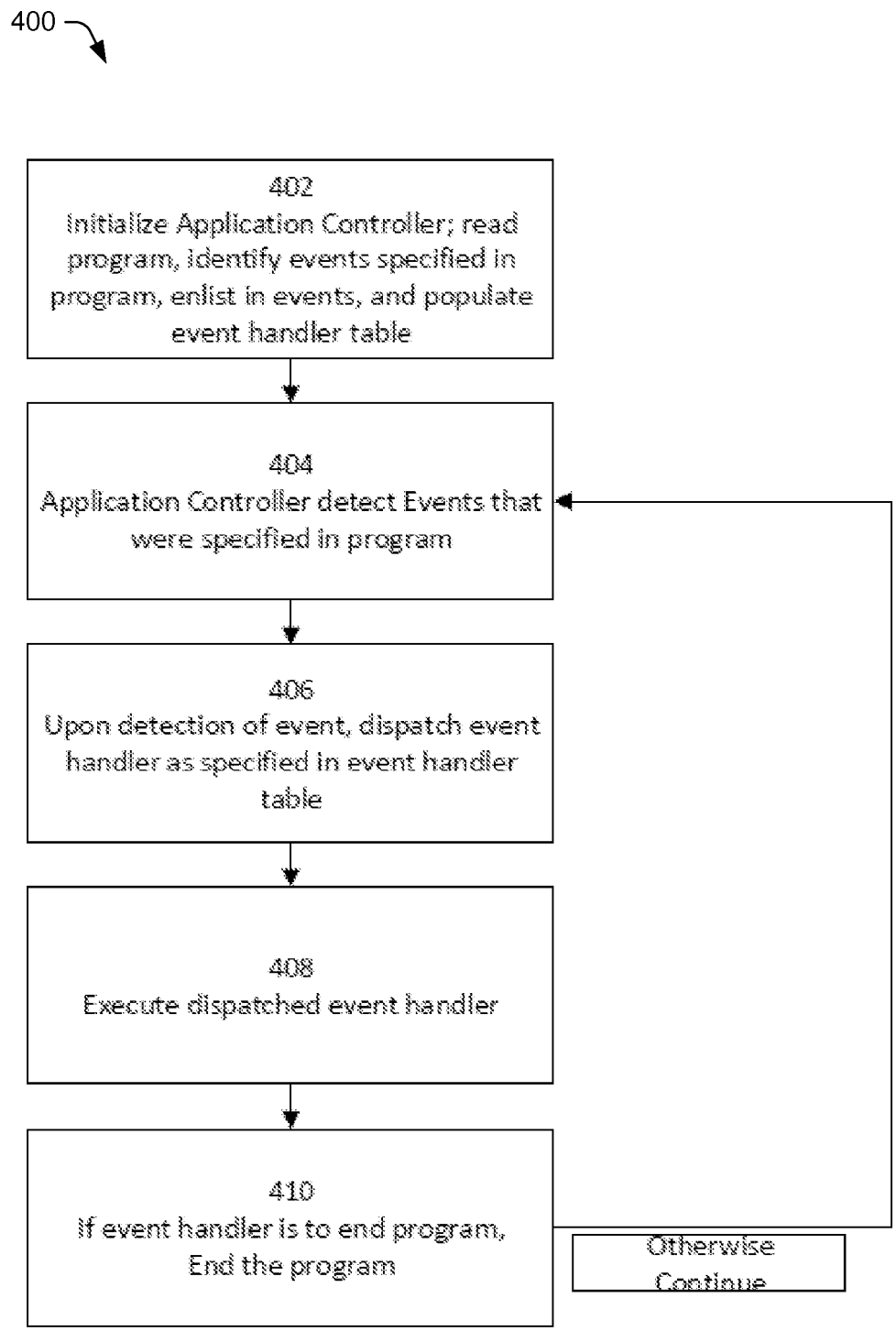
FIG. 4 is a flow chart illustrating an exemplary execution of software for a lighting fixture with an application controllers.

FIG. 4 is a flow chart 400 describing the operation of software, in the form of application programs for a lighting fixture with an application controller. In the use cases where the application controller reacts to events based on time, the application controller may be referred to as a time controller.

An application program will generally include an enumeration of events and associated event handlers. The application program may contain a program loop, or the application controller will have an initialization routine 402 and may have an internal loop to perform the following: block 404 check for events, block 406 upon detecting an event dispatch an event handler, and block 408 execute the event handler. In block 410, if the event handler is not to end the program, the program loop will continue.

Events may come from the system clock which indicates that it is a particular time, from system inputs including user input as well as input from sensors, as well as system events such as notifications from the operating system, other programs, and/or commands in the form of computer executable instructions over the network. The event handlers contain computer executable instructions that the application controller will execute upon being notified of an event.

A program loop first initializes by loading the application program into the application controller. The program loop looks for events in the program and registers in a table the locations of the event handers. If the application program is a compiled program, the location of the event handler may be the memory address where the computer executable instructions comprising the event handler begins. If the application program is a bytecode program or a script, then the program loop initializes a runtime, which in turn stores the offsets of the event handlers. Based on the registered event handlers, the application program then enlists in events. For example, if the application program is configured to detect when the system clock reports the time is 12:00 Noon on a Monday, the application program will enlist in a notification from the operating system which dispatches said notification of when the system clock reports the time as 12:00 Noon on a Monday.

If the application program does not receive an event, it does nothing. However, if the application program receives a notification of an event, it seeks the corresponding event handler, and jumps to execution of the event handler. The application program then performs the execution handler. After execution of the event handler, the application program returns back to the program loop.

The foregoing description describes serial operation of the application program. However, in a system with a multithreaded operating system, the program loop may dispatch independent and concurrent threads to perform the event handlers. Thread synchronization primitives such as mutual exclusions ("mutexes") and/or critical sections may be utilized to prevent deadlock or race conditions. In this way operation of the application program event handlers may be performed in parallel.

Consider the following example program:

```
Event SystemClock(09:00) {
    Light.Intensity = 70%;
}
Event SystemClock(12:00) {
    Light.Intensity = 100%;
}
Event SystemClock(21:00) {
    Light.Intensity = 30%;
}
Event SystemClock(00:00) {
    Light.Intensity = 0%;
}
Event Button(Press) {
    End;
}
```

In the above example program, upon loading, the Application Controller looks for all event declarations. Here, there are five: notifications of when the system clock report 9:00 a.m., 12:00 Noon, 9:00 p.m., and Midnight; and a notification when a button on the chassis is pressed. Between the curly braces is the event handler. The Application program then enlists the enumerated events and maps them in a table to the event handlers. The Application controller then runs a program loop. When the time turns to 9:00 a.m., the Light object calls a controller for the light, and sends the parameter to set the light intensity to 70%. For the events of 12:00 Noon, 9:00 p.m., and Midnight, the application program correspondingly calls the controller for the light and set the light intensity to 100%, 30%, and 0% respectively. The application program will loop forever until a user presses a button. Upon a user pressing a button, a controller for the button will notify the operating system of the button press, and the operating system will send a notification to the application. The application will then execute the corresponding event handler to end the program.

In this way, an application program will provide program logic for any input or output or notification/event. As will be shown with respect to FIG. 8, there are many scenarios where the application program can be used to control the lighting fixture, based on time events as well as other events.

Exemplary Controller Applications

Figure 5:
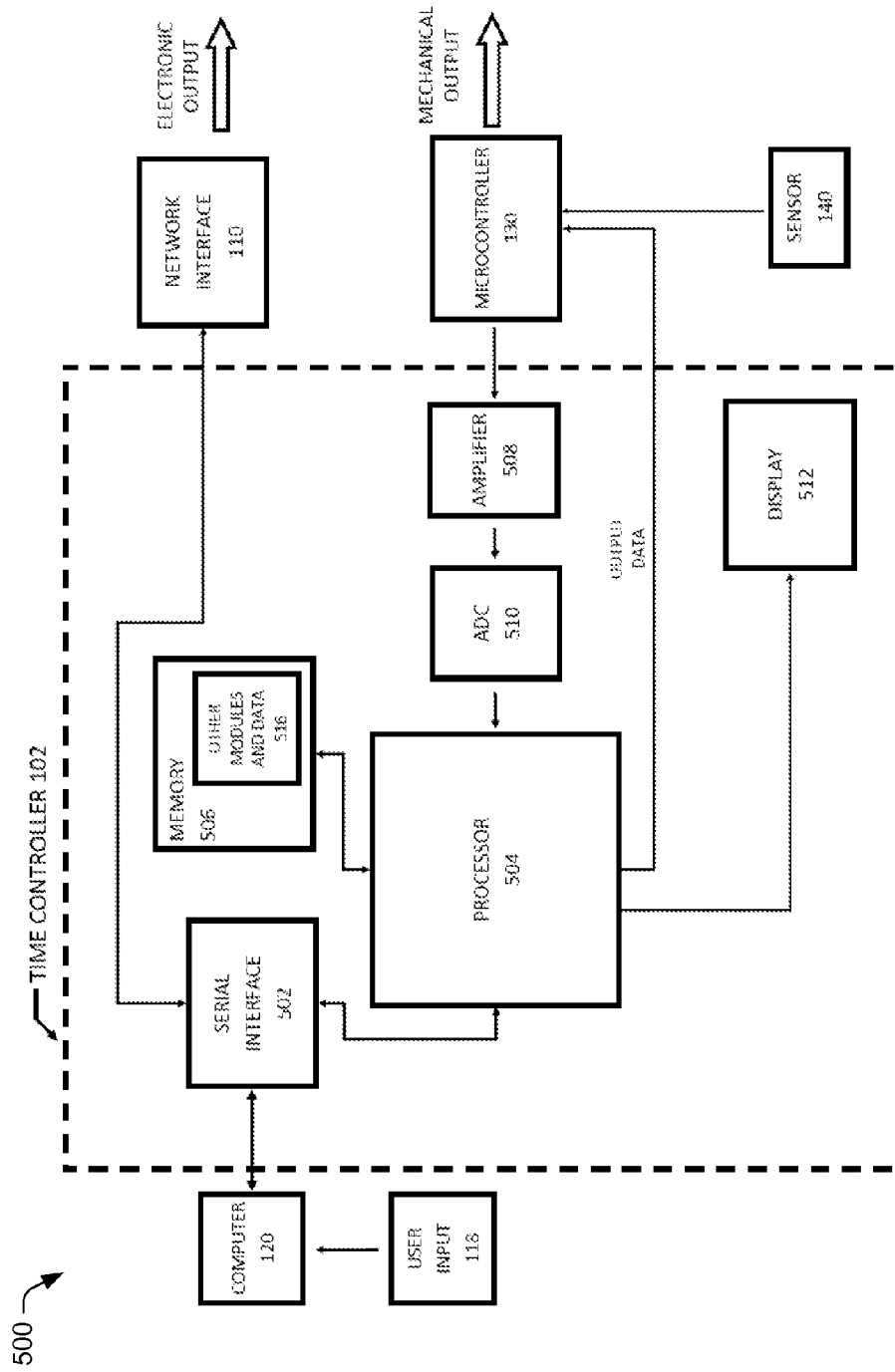
FIG. 5 is a block diagram for an exemplary application controller.

FIG. 5 illustrates a component level view of an application controller that allows electronic and mechanical outputs to be changed over time through a program or user input. As illustrated, the application controller 102 comprises a serial interface 502, a processor 504, system memory 506 which stores other modules and data 516, a signal amplifier 508, an analog to digital converter (ADC) 510, a network interface 110, and an LCD screen 514. The network interface 110, user input from the human user 118, the computer 120, the microcontroller 130, and the sensor 140 are described above in detail with regard to FIG. 1.

In various embodiments, the serial interface 502 may be any physical interface through which information is transferred through a serial stream. A serial interface includes, but is not limited to, serial ports, Ethernet, Firewire™, and universal serial bus ("USB"). The serial interface 502 may receive inputs from a human user 118 or an application program 122. In turn, the serial interface 502 may send outputs to a microcontroller 130. Also, the serial interface 502 may send outputs to a network interface 110. Both types of outputs may be used to change outputs of the lighting fixture 104 or auxiliaries such as watering frequency and/or watering volume. For example, the watering frequency of plants as performed by an automated watering device may be increased or decreased based on a received mechanical output. In another example, the dispensed watering volume for the plants at each watering interval as performed by an automated watering device may be increased or decreased based on another received mechanical output.

In some embodiments, the processor(s) 504 may be a central processing unit ("CPU"), a microcontroller ("MCU"), or both CPU and MCU, or any other sort of processing unit. In various embodiments, system memory 506 may be volatile, such as RAM, non-volatile, such as ROM or flash memory, or may be some combination of the two. For example, the firmware for the application controller 102 may be stored within non-volatile memory such as ROM, EPROM, or flash memory. The other modules or data 516 stored in the system memory 506 may comprise any sort of applications or platform components of the application controller 102, as well as data associated with such applications or platform components.

In various embodiments, the signal amplifier 508 may be any electronic device that increases the power of a signal. An amplifier includes, but is not limited to, a voltage amplifier that receives an input from a sensor 140 and amplifies output voltage so it may be evaluated by the processor 504.

In various embodiments, the ADC 510 is an analog-to-digital converter that converts a continuous physical signal such as, for example, voltage, to a digital signal that may then be interpreted and acted upon by a processor(s) 504.

In some embodiments, the display 512, is an output for presentation of information in visual form. In the case of the application controller 102, the display 512 is an electronic display that may relay information about an input or series of inputs, an output or series of outputs, or allow direct control over the application controller 102 by a human user 118.

The application controller 102, may be used, for example, to output changes to the spectrum produced and/or intensity of the spectrum over time. For example, if a human user 118 or an application program 122 dictated that a red wavelength of 654 nm should change in intensity over time, the application controller 102, for example, could interpolate the differing intensities over a 24 hour time period using an optical sensor. The application program 122 may then evaluate the different intensities to determine if other changes are to be made. Also, in a similar way, the application controller 102 may be used to control a number of variables over time. These variables may include humidity, power draw from the lighting fixture, and/or heat management.

Figure 6:
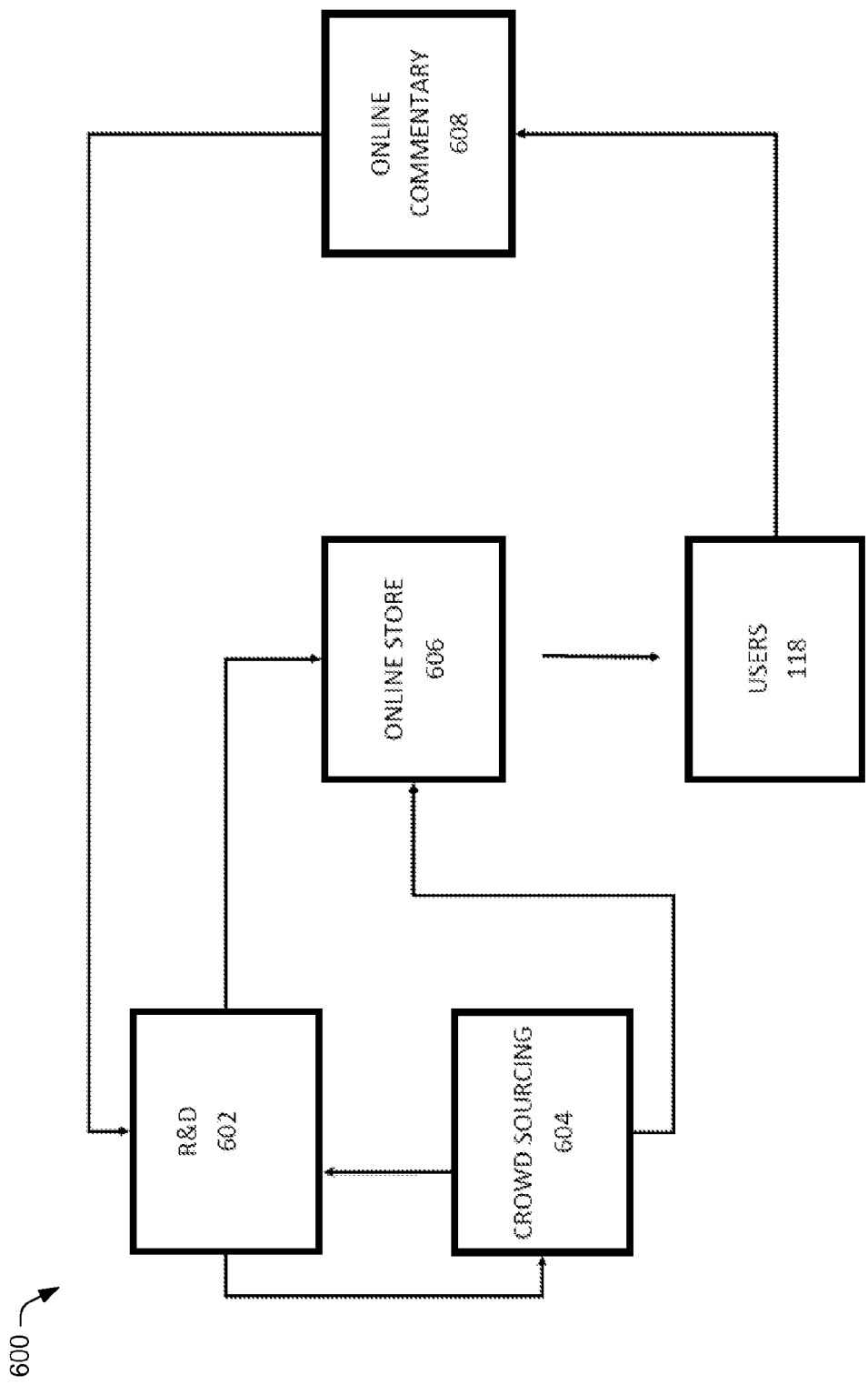
FIG. 6 is an online market of programs for lighting fixtures that have an application controller.

Online Market for Applications for Lighting Fixtures with an Application Controller FIG. 6 illustrates an overview of a hypothetical online market for sourcing of customized programs to be implemented via an application program 122 in tandem with the application controller 102 as described in reference to FIG. 1 above. As illustrated, the market comprises a network of R&D entities 602, crowdsourcing initiatives 604, human users 118, a sort of online buying platform such as an online store 606, and an online commentary mechanism 608.

In various embodiments, the R&D entity 602 may be any entity that possesses the resources and abilities to research and develop programs that work in conjunction with the application controller and thus are able to change the outputs, electronic and mechanical, of the lighting fixture and any auxiliaries over time.

In various embodiments, crowdsourcing initiatives 604 may mean any method of obtaining ideas or content by soliciting contributions from a large group of people from an online community. Crowdsourcing may be either initiated by a research and development ("R&D") entity or self-started by a community member in reference to a particular demand that may occur. As illustrated in FIG. 6, results of crowdsourcing may be either transferred back to the R&D entities or passed on directly to users through an online store 606.

In various embodiments, the online store 606 may be any place where a human user 118 may purchase and acquire a program through the medium of electronic commerce via the internet and use of a web browser. An online store may refer to, but is not limited to, an e-web-store, e-shop, e-store, Internet shop, web-shop, web-store, online store, online storefront or virtual store. The online store 606 may also be accessed through mobile commerce. For example, the online store 606 may be a mobile optimized online store or an app store.

In some embodiments, the online commentary mechanism 608 may mean any method of providing feedback or evaluations of a program received from an R&D entity 602, a crowdsourcing initiative 604, an online store 606, or some combination of any and all sources. The feedback from the online commentary mechanism 608 may be used by R&D entities 602 or users to determine what programs work best for what specific applications.

Hardware Chassis for a Lighting Fixture with an Application Controller

Figure 7:
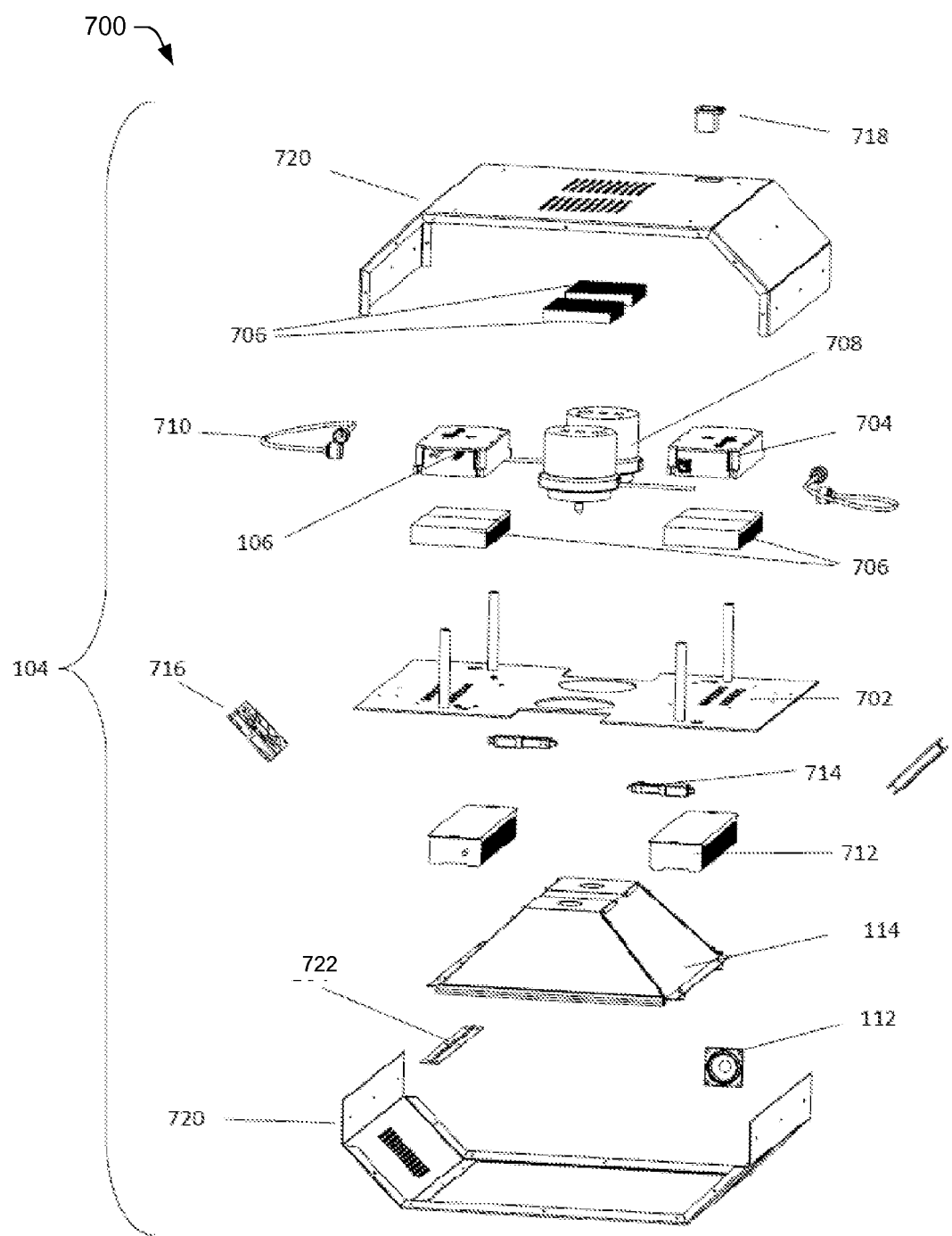
FIG. 7 is an illustrative hardware chassis for a lighting fixture with an application controller.

FIG. 7 illustrates a hardware chassis for lighting fixtures using application controllers. As illustrated, the hardware chassis of a lighting fixture 104 may comprise an audible output device 112, a modifiable reflector 114, a hinge 722, a serial interface(s) 106, a frame 702, a light source driver(s) 704, a heat sink(s) 706, a light source(s) 708, a signal transfer line(s) 710, a power supply(s) 712, an actuator(s) 714, a fan(s) 716, an AC power input 718, and an enclosure 720. The lighting fixture 104, the serial interface 106, audible output device 112, modifiable reflector 114, and fans 204 are described above in detail with regard to FIG. 1 and FIG. 2, respectively.

In various embodiments, the frame 702 is any sort of structure to which components or parts of a lighting fixture 104 may be mounted. In some embodiments, the light source driver 704 may be any component that serves to regulate or aid in the ability of a light source 708 to produce light. For example, a Plasma light engine would utilize a radio frequency driver to create the energy necessary to cause a light source 708 to emit light. Another example of a light source driver 704 would be an LED driver used to power an array of diodes.

In various embodiments, the heat sink(s) 706 may be any type of passive heat exchanger that cools a device by dissipating heat into the surrounding medium. In some embodiments, the light source(s) 708 may be any device(s) that is capable of producing electromagnetic radiation over a range of wavelengths, at a specific wavelength, or some combination of the two. For example, a Plasma light may produce light over a broad spectrum whereas a light emitting diode produces light at a specified wavelength.

In some embodiments, the signal transfer line(s) 710 may be any sort of wire, cable, antennae, etc. that is used to transfer energy between a light source driver 704 and a light source 708. For example, a wire may transfer electricity between a power supply and an array of diodes whereas an antennae cable may transfer a radio signal to an amplifier.

In various embodiments, the power supply(s) 712 is any device that supplies electric power to an electrical load. The power supply 712 may be regulated, i.e., controls the output voltage or current to a specific value, or adjustable. A power supply may obtain energy from electrical energy transmission systems, (e.g. Alternating Current/Direct Current ("AC/DC") conversion), electromechanical systems such as generators, solar power, batteries, or any other source of electrical energy.

In some embodiments, the actuator(s) 714 may include any type of motor or mechanism that is responsible for moving or controlling a mechanism or system. The actuator 714 is operated by an energy source, typically electric current, and converts that energy into motion. Accordingly, the actuator 714 is the mechanism by which an application controller 102 may implement mechanical outputs with respect to the lighting fixture 104, i.e., changing coverage area by actuation of the reflector 114 wall angles.

In various embodiments, the fan(s) 716 may include any fan capable of drawing air from outside of an enclosure 720, expelling warm air from inside an enclosure 720, or moving air across a heat sink 706 to cool a particular component or set of components.

In various embodiments, the alternating current ("AC") power input 718 may be any device capable of receiving power from an alternating current circuit. The AC power input may incorporate a fusible link, a circuit breaker, a switch, or any other type of regulatory/control feature.

In some embodiments, the enclosure 720 may be any sort of structure that contains the majority of components to protect users from electrical shock as well as protect the contents from the environment.

Heat Dispersion in a Lighting Fixture with an Application Controller

Figure 8:
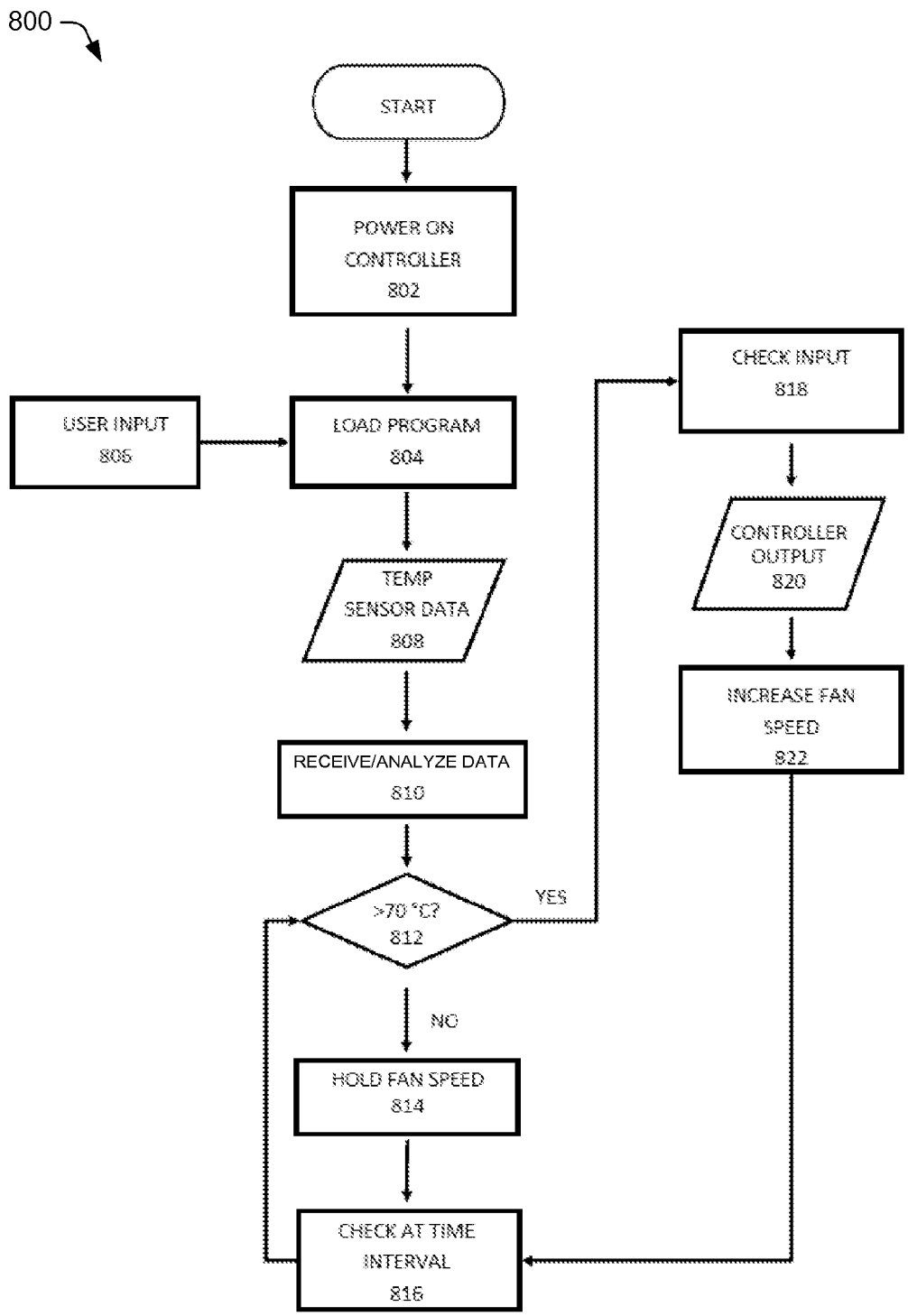
FIG. 8 is a diagram showing exemplary air flow for a lighting fixture with an application controller.

One of the advantages of the present lighting fixture design is improved heat dispersion. FIG. 8 illustrates heat dispersion in one potential embodiment of a lighting fixture with an Application Controller. This process is illustrated as a logical flow graph, each operation of which represents a sequence of events that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Specifically, FIG. 8 illustrates an example process performed by the application controller and software, the processing including establishing a parameter for an output through a user or program input, receiving and analyzing sensor data, checking sensor readings against input parameters, and output changes over time if necessary. The process includes, at 802, powering on an application controller so that an input may be acted upon.

At block 804, an application controller receives inputs from a program. The inputs may command the application controller to monitor a temperature of an environment in the proximity of plants as sensed by a temperature sensor. In some instances, heat generated by the lighting fixture may affect the temperature of this environment. In turn, the program may be configured to maintain a temperature range for the environment that is proximate to the plants at a particular range setting.

At block 806, a user may input commands to change the inputs prescribed by the program to better suit a particular application. For example, the user may change a desired temperature range for the program to maintain for the environment that is proximate to the plants.

At block 808, sensor readings are transmitted through a microcontroller, through the application controller, and finally to the program. The sensor readings may be from the temperature sensor that monitors the temperature of the environment that is in the proximity of the plants.

At block 810, sensor data is analyzed by the program and compared to parameters established. For example, the program may compare the temperature received from the application controller to the predetermined temperature range setting to be maintained.

At block 812, the program makes a decision as to how to respond to the sensor data. For example, the program may maintain or change a speed of a cooling fan based on the sensed temperature and its amount of deviance from the predetermined temperature range setting to be maintained.

At block 814, no response is required and fan speeds are held constant. For example, if the sensed temperature is within the predetermined temperature range setting (e.g., below a certain maximum temperature), then the program may generate an output that causes a fan motor of the fan to maintain the current constant speed.

At block 816, the application controller may check temperature at a time interval specified by the program, which may continue unless a response is required.

At block 818, the program checks the program input and responds to a temperature greater than what is prescribed by the program. For example, if the sensed temperature is higher than the predetermined temperature range setting (e.g., higher than a certain maximum temperature), then the program may determine that the appropriate response is to generate an output to change fan speed.

At block 820, an output is generated by the application controller and sent through a microcontroller. For example, the output generated by the program may be an output that increases the fan speed of the fan.

At block 822, a microcontroller increases fan speed based on output from the application controller, and proceeds to check at time interval prescribed by the application controller.

One advantage to a reverse convection system in regard to horticulture is that vapors generated from pesticides, foliar sprays, etc. may not be sucked into the lighting fixture potentially causing corrosion to components within, as well as allowing the vital functions of such vapors to remain uninterrupted. Another advantage to a reverse convection airflow would be the avoidance of drawing artificially added $CO_2$ away from the plants, limiting its effectiveness. A third advantage, is the added effect of more even heat dispersion, i.e. keeping heat from collecting in the upper portion of an indoor garden which would create a larger temperature gradient between the root zone versus the canopy. Through use of reverse convection airflow, this gradient may be reduced creating an environment that more closely resembles that of a natural, outdoor environment.

Operation of an Application Controller in a Lighting Fixture

Figure 9:
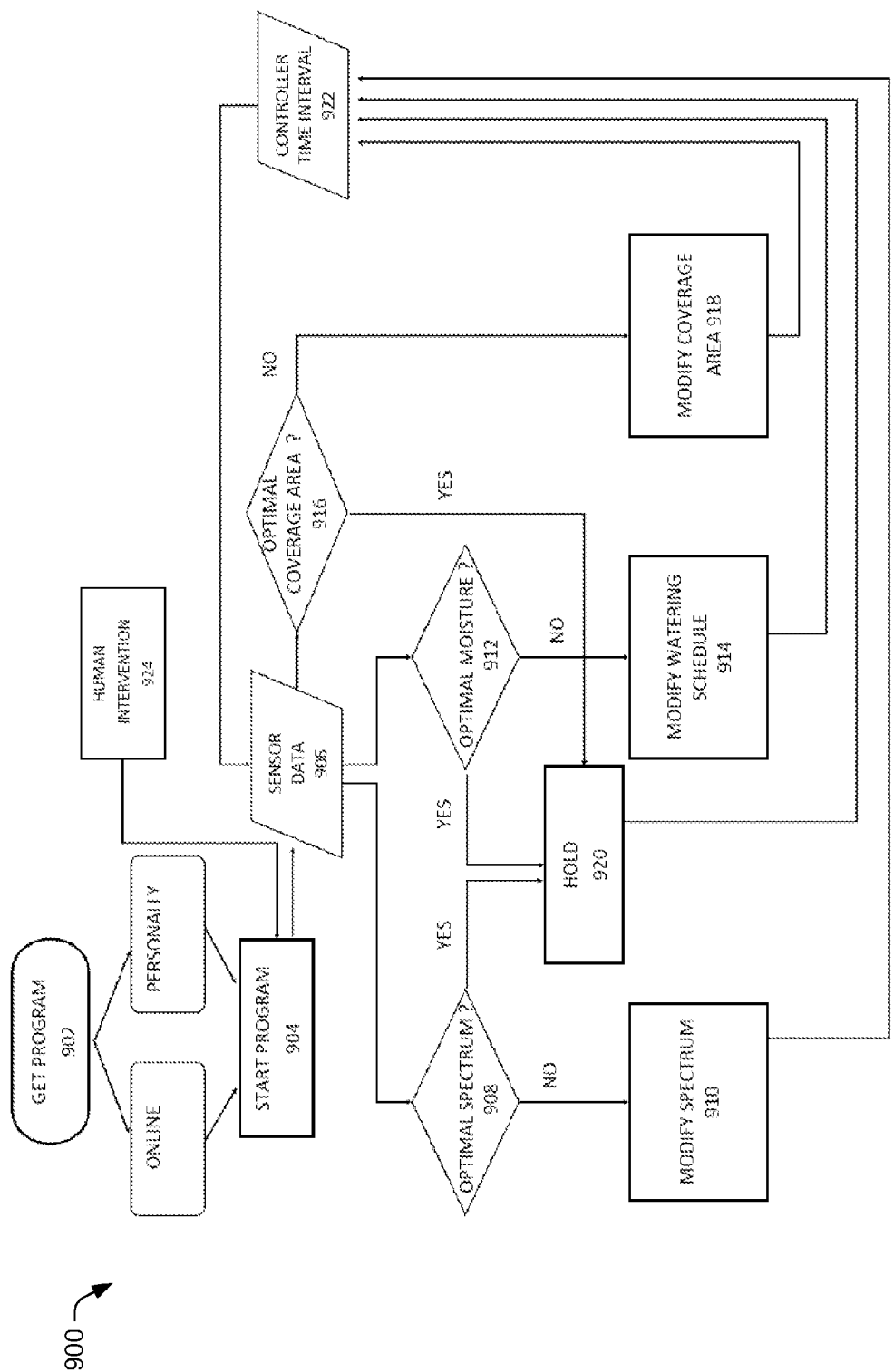
FIG. 9 is a flow chart for programming an application controller for a lighting fixture.

FIG. 9 illustrates an example process that may be performed by an application controller in the context of a lighting fixture. This process is illustrated as a logical flow graph, each operation of which represents a sequence of events that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Specifically, FIG. 9 illustrates an example process performed by the application controller in conjunction with a program, the processing including establishing a parameter for multiple outputs through a user or program input, receiving and analyzing sensor data, checking sensor readings against input parameters, and output changes over time if necessary using an application controller as described in previous figures. In various embodiments, the program may be a horticultural program in which various conditions and/or parameters of the program are to be followed. The process includes, at block 902, acquiring a program, either through an online marketplace or personally programmed.

At block 904, the program is initiated allowing the controller to receive inputs and output commands based on the program parameters. The program may be a horticultural program for growing plants.

At block 906, sensor data is acquired from all relevant and employed sensors, including but not limited to optical sensors for spectrum and coverage area, moisture sensors, heat sensors, or any other sensor pertinent to horticultural applications.

At decision block 908, sensor readings for spectrum are evaluated against the program parameters for optimization, allowing the program to output changes if necessary. For example, if the spectrum is not optimal, the process may proceed to block 910. However, if the spectrum is optimal, the process may proceed to block 920. In this way, the spectrum may be optimized by the program for growing the plants.

At block 910, spectrum is modified by the controller based on outputs not coinciding with the program.

At decision block 912, sensor readings for moisture that is in a growth substrate (e.g., soil) in the proximity of the plants are evaluated against program parameters for optimization, allowing the program to output changes if necessary. For example, if the moisture is not optimal, the process may proceed to block 914. However, if the moisture is optimal, the process may proceed to block 920.

At block 914, water schedule is modified by the controller to increase or decrease watering frequency of the plants in response to program and sensors. In some embodiments, the water schedule is alternatively or concurrently modified by the controller to increase or decrease a volume of water dispensed at each watering interval in response to the program and the sensors.

At decision block 916, sensor readings for coverage area intensity are evaluated against the program parameters for optimization. For example, if the coverage area for growing the plants is not optimal, the process may proceed to block 918. However, if the coverage is optimal, the process may proceed to block 920.

At block 918, coverage area is modified by the controller through use of an actuator, adjusting reflector wall angles until output and program parameters are in agreement.

At block 920, the outputs are held constant based on sensor readings lining up with program parameters.

At block 922, the controller outputs a time interval at which to acquire and evaluate sensor data against the program being implemented. Time intervals for different sensors may differ drastically i.e. moisture readings may occur more frequently than spectrum readings or vice versa.

At block 924, the possibility for a human user to intervene with the program is shown. For example, the human user may adjust program parameters and sensor settings.

The benefits of such a system are many over the status quo. For example, spectrum control may allow the user to add or subtract wavelengths depending on the life stage of a particular crop. Certain wavelengths, such as UVA and UVB, prove extremely efficient in neutralizing mold spores and other bacteria that begin the decomposition of fruits, plants, etc. Spectrum control also allows wavelengths to be conserved for the right time of a plant's life cycle. For example, during vegetative growth stages, higher relative intensities of blue wavelengths (approximately 425-460 nm) are more beneficial to aid in intermodal spacing and development of a solid plant base. During flowering stages, higher relative intensities of red wavelengths (approximately 720-780 nm) are more useful in triggering flowering and aid in flower/fruit development.

By being able to control these relative intensities over time, a user is able to produce better lighting at the right intensity, at the right time, and avoiding problems such as overheating the plants. Reducing heat has secondary effects which benefit the user, such as decreased water usage and evaporation. Critical resources such as water are becoming more and more protected, making advancements such as this instrumental in the development of new, more sustainable horticultural practices.

By utilizing more efficient, full spectrum lighting technologies, such as Plasma, new horticultural possibilities emerge such as indoor berry growing. Current lighting technologies either produce too much heat i.e., HID lighting, or do not produce a broad enough spectrum i.e., LED lighting. Growth conditions for berries may include the use of a full spectrum light that has limited heat production or else pollination cannot occur. With systems such as the one described above, the possibilities are many and may continue to develop as programming and automation becomes more widespread.

CONCLUSION

Although the subject matter has been described in language specific to structural features and/or methodological acts, it is to be understood that the subject matter defined in the appended claims is not necessarily limited the specific features or acts described above. Rather, the specific features and acts described above are disclosed as example forms of implementing the claims.

What is claimed is:

1. A system, comprising:
a lighting fixture including one or more light sources, the lighting fixture spectrally varies a light output of the one or more light sources in response to an electronic output signal;
a light sensor that monitors an output light spectrum provided by the one or more light sources;
an application controller that determines whether the output light spectrum from the one or more light sources follows a program, and generates the electronic output signal to spectrally vary the light output of the one or more light sources in order to follow the program; and
a light reflector that moves in response to a mechanical output signal generated by the application controller to change a light output coverage area of the lighting fixture while maintaining a uniformity of the light output.

2. The system of claim 1, wherein the light sensor monitors an amount of light coverage for at least one plant, and wherein the application controller generates the mechanical output signal to ensure that the amount of light coverage follows the program.

3. The system of claim 1, further comprising a temperature sensor that monitors a temperature proximate to at least one plant, and wherein the application controller generates a mechanical output signal to change a speed of a fan in the lighting fixture in response to the temperature sensed by the temperature sensor exceeding a threshold.

4. The system of claim 3, wherein the fan in the lighting fixture creates a reverse convection in the lighting fixture that prevents suction of sprays for at least one plant into the lighting fixture, prevents drawing away of carbon dioxide from the at least one plant, or prevent a generation of a temperature gradient that affects the at least one plant.

5. The system of claim 1, wherein the lighting fixture spectrally varies the light output by changing an amount of lumens produced at a particular wavelength or a range of wavelengths produced over a particular time duration.

6. The system of claim 1, wherein the one or more light sources include a plasma light source or a light emitting diode (LED) light source.

7. The system of claim 1, wherein the application controller is a software application on a computing device, a part of the software application on the computing device, or a hardware device, and wherein the application controller receives the program from an additional application, an external sensor, a network interface, a universal serial bus interface (USB), or a memory card.

8. The system of claim 1, wherein the application controller further generates a mechanical output signal that causes a change in a position of the lighting fixture relative to at least one plant.

9. The system of claim 1, wherein the application controller receives a user input that dictates a change in an intensity of a light wavelength generated by the lighting fixture over a time period, and generates an additional electronic output signal that varies the light output of the light sources during the time period according to the user input.

10. The system of claim 1, wherein the electronic output signal generated by the application controller spectrally varies the light output of the light sources according to a time schedule.

11. The system of claim 1, wherein the application controller further generates an additional electronic output signal that causes a change in a watering frequency or a watering volume for at least one plant by an automated watering device, causes a generation of audible frequencies by a speaker, or causes a change in a concentration of carbon dioxide distributed by a carbon dioxide generator to the at least one plant.

12. A computer-implemented method, comprising:
receiving a horticultural program that dictates environmental conditions for growing at least one plant at an application controller;
receiving information on an output light spectrum provided by one or more light sources of a lighting fixture to a plant at the application controller from a light sensor, the one or more light sources spectrally vary light output in response to an electronic output signal from the application controller;
generating the electronic output signal at the application controller to spectrally varies the light output of the one or more light sources based at least on the information on the output light spectrum in order to follow the horticultural program;
receiving a temperature proximate to the at least one plant at the application controller from a temperature sensor; and
generating a mechanical output signal at the application controller that changes a speed of a fan in the lighting fixture in response to the temperature sensor sensing that the temperature exceeded a threshold.

13. The computer-implemented method of claim 12, wherein the horticultural program dictates environment conditions for growing different plants, further comprising:
receiving information on an additional output light spectrum provided by one or more additional light sources of an additional lighting fixture to an additional plant at the application controller, the one or more light additional sources spectrally varies light output in response to an additional electronic output signal; and
generating the additional electronic output signal to spectrally varies the additional light output of the one or more additional light source based at least on the information on the additional output light spectrum in order to follow the horticultural program.

14. The computer-implemented method of claim 12, further comprising:
receiving information on an amount of light coverage for the plant at the application controller from the light sensor; and
generating a mechanical output signal at the application controller to actuate a light reflector of the lighting fixture that changes a light output coverage area of the lighting fixture while maintaining a uniformity of the light output to ensure that the amount of light coverage follows the horticultural program.

15. The computer-implemented method of claim 12, further comprising:
receiving a user input at the application controller that dictates a change in an intensity of a light wavelength generated by the lighting fixture over a time period; and
generating an additional electronic output signal at the application controller that varies the light output of the light sources during the time period according to the user input.

16. The computer-implemented method of claim 12, further comprising:
receiving information on an amount of moisture proximate the plant at the application controller from a moisture sensor; and
generating a mechanical output signal at the application controller to change a watering frequency or a watering volume for the plant by an automated watering device to ensure that the amount of moisture proximate the plant follows the horticultural program.

17. One or more non-transitory computer-readable media storing computer-executable instructions that upon execution cause one or more processors to perform acts comprising:
receiving a horticultural program that dictates environmental conditions for growing at least one plant at an application controller, the application controller receiving the horticultural program from an additional application, an external sensor, or a network interface;
receiving information on an output light spectrum provided by a plurality of plasma light sources in a lighting fixture to the at least one plant at the application controller from a light sensor, the plurality of plasma light sources spectrally vary light output in response to an electronic output signal from the application controller;
generating the electronic output signal at the application controller to spectrally vary the light output of the plurality of plasma light sources based at least on the information on the output light spectrum in order to follow the horticultural program, the electronic output signal causing the plurality of plasma light sources to change an amount of lumens produced at a particular wavelength or a range of wavelengths produced over a particular time duration;
receiving information on an amount of light coverage for the at least plant at the application controller from the light sensor; and
generating a mechanical output signal at the application controller to actuate a light reflector of the lighting fixture that changes a light output coverage area of the lighting fixture while maintaining a uniformity of the light output to ensure that the amount of light coverage follows the horticultural program.

18. The one or more non-transitory computer-readable media of claim 17, wherein the acts further comprise generating an additional electronic output signal at the application controller that causes a change in a speed of a fan in the lighting fixture, a change in a watering frequency or a watering volume for the at least one plant by an automated watering device, causes a generation of audible frequencies by a speaker, or causes a change in a concentration of carbon dioxide distributed by a carbon dioxide generator to the at least one plant.

19. The one or more non-transitory computer-readable media of claim 17, wherein the acts further comprise:
receiving a user input at the application controller that dictates a change in an intensity of a light wavelength generated by the lighting fixture over a time period; and
generating an additional electronic output signal at the application controller that varies the light output of the light sources during the time period according to the user input.

20. The one or more non-transitory computer-readable media of claim 17, wherein acts further comprise generating a mechanical output signal that causes a motorized system to change a position of the lighting fixture relative to the at least one plant.

21. A system, comprising:
a lighting fixture including one or more light sources, the lighting fixture spectrally varies a light output of the one or more light sources in response to an electronic output signal;
a light sensor that monitors an output light spectrum provided by the one or more light sources; and
an application controller that determines whether the output light spectrum from the one or more light sources follows a program, and generates the electronic output signal to spectrally vary the light output of the one or more light sources in order to follow the program,
wherein the application controller further generates a mechanical output signal that causes a change in a position of the lighting fixture relative to at least one plant.

22. A system, comprising:
a lighting fixture including one or more light sources, the lighting fixture spectrally varies a light output of the one or more light sources in response to an electronic output signal;
a light sensor that monitors an output light spectrum provided by the one or more light sources; and
an application controller that determines whether the output light spectrum from the one or more light sources follows a program, and generates the electronic output signal to spectrally vary the light output of the one or more light sources in order to follow the program,
wherein the application controller receives a user input that dictates a change in an intensity of a light wavelength generated by the lighting fixture over a time period, and generates an additional electronic output signal that varies the light output of the light sources during the time period according to the user input.

23. A system, comprising:
a lighting fixture including one or more light sources, the lighting fixture spectrally varies a light output of the one or more light sources in response to an electronic output signal;
a light sensor that monitors an output light spectrum provided by the one or more light sources; and
an application controller that determines whether the output light spectrum from the one or more light sources follows a program, and generates the electronic output signal to spectrally vary the light output of the one or more light sources in order to follow the program,
wherein the application controller further generates an additional electronic output signal that causes a change in a watering frequency or a watering volume for at least one plant by an automated watering device, causes a generation of audible frequencies by a speaker, or causes a change in a concentration of carbon dioxide distributed by a carbon dioxide generator to the at least one plant.

* * * * *